United States Patent [19]

Iwasaki et al.

[11] Patent Number: 5,200,458

[45] Date of Patent: Apr. 6, 1993

[54] ADHESIVE COMPOSITION

[75] Inventors: Masaharu Iwasaki, Toda; Takashi Yonehara; Hiroyasu Morinaga, both of Kawaguchi; Satoshi Okajima; Katsuhiro Koda, both of Tokyo, all of Japan

[73] Assignee: Oshika Shinko Co., Ltd., Tokyo, Japan

[21] Appl. No.: 689,944

[22] PCT Filed: Dec. 7, 1989

[86] PCT No.: PCT/JP89/01226

§ 371 Date: May 30, 1991

§ 102(e) Date: May 30, 1991

[87] PCT Pub. No.: WO90/06348

PCT Pub. Date: Jun. 14, 1990

[30] Foreign Application Priority Data

Dec. 9, 1988 [JP] Japan ................................ 63-310135
Dec. 9, 1988 [JP] Japan ................................ 63-310136

[51] Int. Cl.⁵ ............................................. C08K 3/34
[52] U.S. Cl. .................................. 524/456; 524/503; 524/507
[58] Field of Search .................... 524/503, 456, 507

[56] References Cited

U.S. PATENT DOCUMENTS

| 4,350,788 | 9/1982 | Shimokawa et al. | 524/309 |
| 4,735,986 | 4/1988 | Iacoviello | 524/427 |
| 4,861,853 | 8/1989 | Petrie et al. | 526/302 |
| 4,895,890 | 1/1990 | Sawanobori et al. | 524/456 |
| 4,921,898 | 5/1990 | Lenney et al. | 524/459 |
| 4,975,481 | 12/1990 | Tamm et al. | 524/503 |

FOREIGN PATENT DOCUMENTS 59-1581 1/1984 Japan .

*Primary Examiner*—Paul R. Michl
*Assistant Examiner*—John J. Guarriello
*Attorney, Agent, or Firm*—Kenyon & Kenyon

[57] ABSTRACT

An adhesive composition can be provided which comprises a vinyl acetate polymer emulsion containing acetoacetylated polyvinyl alcohol as a protective colloid and a calcium silicate alone or the calcium silicate and an isocyanate compounded therein, which can solve the disadvantages observed in the adhesives of systems in which the isocyanates are added to the emulsions like the prior art, and which retains the adhesive strength for a long time, particularly has a little reduction in initial adhesive strength, and is excellent in water resistance (water-resistant adhesion) and also in heat resistance (heat-resistant adhesion) compared to those of the prior-art adhesives.

7 Claims, No Drawings

ADHESIVE COMPOSITION

TECHNICAL FIELD

The present invention relates to an adhesive composition, and more particularly to an adhesive of a vinyl acetate polymer emulsion suitable as an adhesive for wood.

BACKGROUND ART

Previously, various adhesives mainly composed of polymer emulsions have been proposed.

In Japanese Patent Publication No. 51-30576, there has been proposed "a water-resistant adhesive comprising an aqueous emulsion which contains polyvinyl alcohol and in which an isocyanate compound or an isocyanate polymer (hereinafter sometimes referred to as an isocyanate), and an extender and/or a filler reactive to said isocyanate are compounded".

However, when the isocyanate is thus directly compounded in the aqueous polymer emulsion containing water, the reaction proceeds with violence by the reaction of the isocyanate with water, which causes severe foaming and a significant increase in viscosity of the adhesive, a shorter available time, deteriorated coating workability and a remarkable reduction in adhesive strength. These cause serious obstacles on practical use.

Then, in order to remove such disadvantages, it has come to be carried out that the isocyanate once dissolved in a solvent is compounded in the aqueous polymer emulsion.

Namely, in Japanese Patent Publication No. 51-30577, there is proposed "a water-resistant adhesive comprising an aqueous emulsion which contains polyvinyl alcohol and in which an isocyanate compound or an isocyanate polymer dissolved in a solvent having little mutual solubility with water, but having mutual solubility with said isocyanate is dispersed". Further, in Japanese Patent Publication No. 58-29826, there is proposed "a water-resistant adhesive comprising an aqueous emulsion in which (1) polyvinyl alcohol, (2) a compound having an isocyanate group dissolved in a hydrophobic solvent and (3) a surface active agent and/or a formalin condensation resin are compounded".

As described above, these adhesives intend to prolong the available time by the use of the solvent.

However, there occurs the phenomenon that also these adhesives foam, increase in viscosity and thereby rapidly decrease in water resistance after an elapse of about 1 to 2 hours, when used at a temperature of 30° to 40° C. in summer. This brings about the situation that the temperature of a working room must be reduced to 25° C. or lower, or that the adhesives must be used up within a short period of time such as 1 to 2 hours.

On the other hand, there is advanced an emulsion adhesive using acetoacetylated polyvinyl alcohol as a protective colloid.

The adhesive of a vinyl acetate polymer emulsion using the acetoacetylated polyvinyl alcohol as the protective colloid is superior in water resistance, when compared to the adhesive of the vinyl acetate polymer emulsion using the polyvinyl alcohol not acetoacetylated as the protective colloid as described above. This adhesive is therefore used as an adhesive for paper, furniture and thin veneer. However, in the water resistance of the adhesive concerned, the adhesive property is apt to be insufficient for fields in which the high water resistance is required, including the above-mentioned applications, for example, for applications such as laminated lumber, high-grade furniture, thick veneer and flash boards, and therefore a problem is practically encountered.

Under present conditions, it is intended to improve the water resistance of the emulsions concerned by compounding formalin resins such as urea-formalin resins and melamine-formalin resins in vinyl acetate polymer emulsions as means to solve this problem. However, these methods have the disadvantages that the available time is short and that formalin is released from furniture to produce a pollution problem.

On the other hand, in Japanese Patent Publication No. 59-1581, there is proposed an adhesive composition for wood comprising a vinyl acetate polymer emulsion in which the acetoacetylated polyvinyl alcohol concerned is used as the protective colloid and to which an isocyanate compound, an epoxy compound, a radical-forming compound and an oxidizing agent are added as agents for imparting water resistance (agents for improving water resistance).

However, addition of such agents for imparting water resistance deteriorates the pot life (shelf life), and therefore its improvement is desired from the point of workability. Further, when the isocyanate compound or the like is added, the adhesion is reduced with time.

Furthermore, in Japanese Patent Unexamined Publication No. 48-72235, there is proposed a polyvinyl acetate emulsion adhesive comprising a polyvinyl acetate emulsion which contains a hydrophilic protective colloid and in which zirconyl nitrate and zirconyl chloride are incorporated.

However, adhesive compositions containing metal salts such as zirconyl nitrate and zirconyl chloride have the problems that they show strong acidity in pH to cause pollution and deterioration of wood, and that they are weak in adhesion for fields in which high water resistance is required.

Moreover, in Japanese Patent Unexamined Publication No. 60-24077, there is proposed "an aqueous dispersion two liquid-type adhesive comprising a main adhesive component mainly composed of an aqueous emulsion containing acetoacetylated polyvinyl alcohol and an epoxy compound, and a curing agent component mainly composed of an isocyanate compound.

Namely, this adhesive is one in which there is used the aqueous emulsion containing the epoxy compound in addition to the acetoacetylated polyvinyl alcohol.

However, this adhesive has the problem that the retention time of the adhesive strength (change in adhesive strength with time) is short, though slightly changes in viscosity and is good in apparent condition.

Then, it is an object of the present invention to provide an adhesive composition solving such prior-art disadvantages.

The above and other objects and features of the present invention will become apparent from the whole description of this specification.

DISCLOSURE OF INVENTION

The present invention to achieve such objects provides an adhesive composition comprising a vinyl acetate polymer emulsion which contains acetoacetylated polyvinyl alcohol as a protective colloid and in which a calcium silicate is compounded; and an adhesive composition comprising a vinyl acetate polymer emulsion which contains acetoacetylated polyvinyl alcohol as a protective colloid and in which a calcium silicate and an isocyanate compound or an isocyanate polymer are compounded.

In accordance with the present invention, as shown in examples which will hereinafter be described, the calcium silicate is compounded in the vinyl acetate polymer emulsion containing the acetoacetylated polyvinyl alcohol as the protective colloid, and thereby the disadvantages previously observed are solved. Accordingly, there could be provided the superior adhesive excellent in water-resistant adhesive property and in hot water-resistant adhesive property and having a slight change in adhesion with time.

Further, according to the present invention, the calcium silicate and the isocyanate are compounded in the vinyl acetate polymer emulsion containing the acetoacetylated polyvinyl alcohol as the protective colloid, and thereby the disadvantages observed in the adhesives of systems in which the isocyanates are added to the emulsions like the prior art can be solved. Accordingly, there could be provided the adhesive retaining the adhesive strength for a long period of time, particularly having a little reduction in initial adhesive strength, and excellent in water resistance (water-resistant adhesion) and also in heat resistance (heat-resistant adhesion) compared to those of the prior-art adhesives.

The reason why the adhesive excellent in workability and also in adhesive properties is thus obtained according to the present invention is not definite. However, in the adhesive having the system of (the calcium silicate)-(the vinyl acetate polymer containing the acetoacetylated polyvinyl alcohol as the protective colloid)-(the isocyanate), it is presumed that the polymer (resin) excellent in initial adhesion, in water resistance and in heat resistance can be produced by the combined action of that an isocyanate group in the isocyanate selectively acts on a hydroxyl group in the acetoacetylated polyvinyl alcohol and that the reaction of the isocyanate group with water in the vinyl acetate emulsion is restricted thereby.

Further, according to the present invention, it is not necessary to use any solvent. As a result, there are no problems of work environment such as the generation of odors and the danger of fires. Moreover, there could be provided the adhesive showing no viscosity-increasing phenomenon within a short period of time even in summer, and having a prolonged available time and the water resistance prevented from its rapid reduction.

The acetoacetylated polyvinyl alcohol in the present invention can be obtained, for example, by their reaction of polyvinyl alcohol with diketene. The mean degree of saponification and the mean degree of polymerization of the polyvinyl alcohol containing acetoacetyl groups are not particularly limited. However, the polyvinyl alcohol having residual acetic acid groups within the range of 0.1 to 15 mol % and a mean degree of polymerization ranging from 500 to 2600 is preferably used in respect to the effect as the protective colloid.

Here, it is suitable that the content of the acetoacetyl groups is between 0.05 and 15 mol %, preferably within the range of 2 to 8 mol %. If the content of the acetoacetyl groups is less than 0.05 mol %, the emulsion less contributes to the water resistance and the stability. On the other hand, if the content of the acetoacetyl groups exceeds 15 mol %, the dispersion in emulsion polymerization becomes insufficient, so that the homogeneous emulsion can not be obtained or the resulting emulsion is poor in stability. The resulting emulsion is therefore undesirable as a practical product.

Examples of the vinyl acetate polymer emulsions in the present invention include resin emulsions containing vinyl acetate components such as (homo)vinyl acetate resin emulsions, ethylene-vinyl acetate copolymer resin emulsions, vinyl acetate-acrylic ester copolymer resin emulsions and vinyl acetate-methacrylic acid ester copolymer resin emulsions.

The vinyl acetate polymer emulsion containing the acetoacetylated polyvinyl alcohol (hereinafter sometimes referred to as AAated PVA) as the protective colloid used in the present invention can be obtained, for example, by emulsion polymerizing a vinyl acetate monomer alone or in combination with another polymerizable monomer as exemplified in the above, using the above-mentioned AAated PVA as the protective colloid, by methods known in the art.

It is suitable from the desired object of the present invention that the AAated PVA as the protective colloid is used in an amount of 6 to 20% by weight to the solid content of the vinyl acetate polymer emulsion.

When the calcium silicate and the isocyanate are compounded, it is suitable from the desired object of the present invention that the AAated PVA as the protective colloid in the vinyl acetate polymer emulsion is used in an amount of 6 to 12% by weight to the solid content of the vinyl acetate polymer emulsion.

When the emulsion polymerization is conducted to produce the vinyl acetate polymer emulsion, it is preferred that the polymerization temperature is 60° to 80° C. and that the reaction time is 2 to 8 hours.

As emulsion polymerization catalysts required on the polymerization, usual emulsion polymerization catalysts may be used. However, redox catalysts are particularly preferable. Illustrative examples thereof include combinations of hydrogen peroxide and formaldehyde or zinc sulfoxylate, hydrogen peroxide and tartaric acid, and hydrogen peroxide, ammonium persulfate or potassium persulfate and sodium metabisulfite.

On the occasion of the above-mentioned polymerization, other water-soluble protective colloids such as hydroxyethyl cellulose, starch, carboxymethyl cellulose and gum arabic may be used in combination with the AAated PVA.

Further, nonionic surface active agents and anionic surface active agents as emulsifiers may be used in combination with the AAated PVA.

Furthermore, there may be used on the occasion of the polymerization pH regulators, for example, calcium carbonate; slaked lime; acetates such as calcium acetate, sodium acetate, zinc acetate and aluminium acetate; acids such as malonic acid and β-keto-acid esters; β-diketones; and acid sulfites.

In addition, various additives used in emulsion polymerization may be employed.

The term "calcium silicate" used in the present invention is used as the concept which contains calcium silicate generically naming compounds having compositions of calcium oxide (CaO) and silicon dioxide ($SiO_2$) combined together, and substances similar to this.

As the calcium silicate may be mentioned calcium metasilicate ($CaO.SiO_2$), calcium orthosilicate (dicalcium silicate, $2CaO.SiO_2$), tricalcium silicate ($3CaO.SiO_2$) and the like.

The calcium silicate can be produced by burning or melting CaO and $SiO_2$ at elevated temperatures.

Examples of the substances similar to the calcium silicate include calcium sodium silicate ($2Na_2SiO_3 \cdot 3CaSiO_3$).

The calcium silicates in the present invention can be used, regardless of whether they are synthetic products or natural products.

As the calcium silicates, the calcium silicate is preferable. Its composition ratio of CaO to $SiO_2$ is not particularly limited, but $CaO/SiO_2 = 5/95$ to $60/40$ is preferable.

When $CaO/SiO_2$ is below 5/above 95, the water-resistant and heat-resistant adhesive strengths and the retention time are reduced, while when $CaO/SiO_2$ is above 60/below 40, the change in viscosity is violent.

The compounding amount of the calcium silicates (hereinafter simply referred to as calcium silicate) in the present invention is 0.5 to 100 parts by weight, preferably 2 to 60 parts by weight, to 100 parts by weight of the solid content of the vinyl acetate polymer emulsion containing the AAated PVA as the protective colloid.

When the compounding amount (addition amount) of the calcium silicate is less than 0.5 part by weight, the water-resistant adhesion and the heat-resistant adhesion are poor. On the other hand, when the compounding amount exceeds 100 parts by weight, the wetting to adherends becomes worse and the above-mentioned adhesive properties are deteriorated to induce a problem when used.

The isocyanate compounds or the isocyanate polymers used in the present invention may be any ones as long as they contain at least two isocyanate (NCO) groups in each molecule. For example, there can be mentioned TDI (tolylene diisocyanate), hydrogenated TDI, trimethylolpropan (TMP)-TDI adduct, triphenylmethane triisocyanate, diphenylmethane diisocyanate (MDI), xylylene diisocyanate and the like. In addition, there may be used a prepolymer terminated with NCO groups which is obtained by polymerizing previously a polyol with an excess of a polyisocyanate.

The compounding ratio of the isocyanate compounds or the isocyanate polymers is 40 to 800 parts by weight, preferably 100 to 400 parts by weight, to the AAated PVA (solid component) contained in the vinyl acetate polymer emulsion. When the compounding amount of the isocyanates is less than 40 parts by weight, the water-resistant adhesion and the heat-resistant adhesion become insufficient. On the other hand, when the compounding amount is more than 800 parts by weight, the available time becomes short.

To the adhesive composition of the present invention may be added various additives, for example, fillers such as clay, kaolin and wood powder; extenders such as wheat flour and starch; reaction promoters such as boric acid and aluminium sulfate; pigments such as titanium oxide; antiseptics, insecticides and rust preventives, as so desired.

BEST MODES FOR CARRYING OUT THE INVENTION

The present invention is further illustrated by the following examples and comparative examples.

In the following examples and comparative examples, all parts are by weight unless otherwise stated.

EXAMPLE 1

| | |
|---|---|
| Acetoacetylated polyvinyl alcohol | 5 (parts) |
| "Gohse Fimer Z-200" manufactured by The Nippon Synthetic Chemical Industry Co., Ltd. | |
| Vinyl acetate monomer | 35 (parts) |
| 1% potassium persulfate aqueous solution | 9 (parts) |
| Water | 51 (parts) |
| Sodium acetate | 0.05 (part) |

In accordance with the above-mentioned composition, a vinyl acetate polymer emulsion containing acetoacetylated polyvinyl alcohol as a protective colloid was prepared as follows.

The preparation of the emulsion was conducted in an aqueous solution in a separable flask of glass equipped with a stirrer, a dropping funnel, a condenser and a thermometer.

First, 50 parts of a 10% aqueous solution of acetoacetylated polyvinyl alcohol, 6 parts of water, 0.005 part of sodium acetate and 3.5 parts of vinyl acetate monomer were placed in the separable flask, and the internal temperature of the flask was elevated to 70° C. while stirring.

After the internal temperature of the separable flask reached 70° C., the dropping of 1% aqueous potassium persulfate was initiated. 9 parts of 1% aqueous potassium persulfate was added dropwise over 4 hours.

After 1 hour, the internal temperature of the separable flask was adjusted to 75° to 80° C., and 31.5 parts of vinyl acetate monomer was added dropwise over 3 hours.

After the termination of the dropping of vinyl acetate monomer, the contents were conditioned keeping the internal temperature of the separable flask at 75° to 80° C. for 1 hour. Then, the resulting product was cooled, and thus an acetoacetylated vinyl acetate polymer emulsion having a viscosity of 948 Ps (poise)/30° C. was obtained. This emulsion is hereinafter referred to as Em-1.

Into 100 parts of the Em-1 was dispersed 15 parts of Kemolit ABS-3 (CaO: 48%, $SiO_2$: 49%, manufactured by Maruwa Biochemical Co., Ltd.) as the calcium silicate, thereby preparing an adhesive composition.

EXAMPLE 2

An adhesive composition was prepared as with Example 1 except that 3 parts of Solex CM (CaO: 21%, $SiO_2$: 57%, manufactured by Tokuyama Soda Co., Ltd.) was dispersed as the calcium silicate.

EXAMPLE 3

An adhesive composition was prepared as with Example 1 except that 3 parts of Florite R (CaO: 22%, $SiO_2$: 60%, manufactured by Tokuyama Soda Co., Ltd.) was dispersed as the calcium silicate.

COMPARATIVE EXAMPLE 1

An adhesive compositio composed of the Em-1 alone was prepared without using the calcium silicate in Example 1.

COMPARATIVE EXAMPLE 2

An adhesive composition was prepared as with Example 1 except that the calcium silicate was not used and 15 parts of an isocyanate compound (trade name: Sumidur 44V-20, manufactured by Sumitomo Bayer Urethane Co., Ltd.) was used in Example 1.

COMPARATIVE EXAMPLE 3

Into 100 parts of the Em-1 used in Example 1 was dispersed 35 parts of an epoxy resin emulsion (prepared by forcing to disperse 100 parts of a bisphenol A-type liquid epoxy resin into 100 parts of water with 4 parts of a nonionic emulsifier), and then 15 parts of the MDI-series isocyanate (trade name: Sumidur 44V-20, manufactured by Sumitomo Bayer Urethane Co., Ltd.) was mixed and dispersed therein, thereby preparing an adhesive composition (no calcium silicate was added thereto).

COMPARATIVE EXAMPLE 4

An adhesive composition was prepared as with Example 1 with the exception that the calcium silicate was substituted for 5 parts of quick lime (CaO: at least 98%, extra pure reagent, manufactured by Junsei Kagaku Co.) in Example 1.

COMPARATIVE EXAMPLE 5

An adhesive composition was prepared as with Example 1 with the exception that the calcium silicate was substituted for 15 parts of silicic acid ($SiO_2$: at least 99%, Crystalite AI, manufactured by Takimori Ltd.) in Example 1.

COMPARATIVE EXAMPLE 6

An adhesive composition was prepared as with Comparative Example 5 except that 1 part of Aerosil 200 having a $SiO_2$ content of at least 99% (ultra fine-grained silicic acid anhydride, manufactured by Nippon Aerosil Co.) was used as silicic acid.

COMPARATIVE EXAMPLE 7

Into 100 parts of the Em-1 used in Example 1 was dispersed 15 parts of calcium carbonate (Whiton P-30, manufactured by Shiraishi Kogyo Kaisha, Ltd.), and then 15 parts of the isocyanate compound used in Comparative Example 3 was mixed and dispersed therein, thereby preparing an adhesive composition.

COMPARATIVE EXAMPLE 8

An adhesive composition was prepared as with Comparative Example 7 with the exception that calcium carbonate was substituted for 15 parts of talc (Talc 3S, manufactured by Nippon Talc Co.).

COMPARATIVE EXAMPLE 9

An adhesive composition was prepared as with Comparative Example 8 with the exception that calcium carbonate was substituted for 15 parts of kaolin clay (Burgess Kaolin Clay No. 10, manufactured by Burgess Pigment Co.).

COMPARATIVE EXAMPLE 10

An adhesive composition was prepared as with Comparative Example 9 with the exception that calcium carbonate was substituted for 10 parts of zirconium silicate (Micropax 20-A, manufactured by Hakusui Chemical Industries Ltd.).

COMPARATIVE EXAMPLE 11

The emulsion polymerization was conducted as with Example 1 with the exception that the acetoacetylated polyvinyl alcohol used in Example 1 was substituted for partially saponificated PVA having a mean degree of polymerization of 1700 (PVA NH-17, manufactured by The Nippon Synthetic Chemical Industry Co., Ltd.), and thereby a vinyl acetate polymer emulsion having a viscosity of 540 Ps/30° C. was obtained. This emulsion is hereinafter referred to as Em-2.

Into 100 parts of the Em-2 was mixed and dispersed 15 parts of Kemolit ABS-3 (CaO: 48%, $SiO_2$: 49%, manufactured by Maruwa Biochemical Co., Ltd.) as the calcium silicate, thereby preparing an adhesive composition.

COMPARATIVE EXAMPLE 12

An adhesive composition was prepared as with Comparative Example 11 with the exception that 3 parts of Florite R (CaO: 21%, $SiO_2$: 57%, manufactured by Tokuyama Soda Co., Ltd.) was dispersed into 100 parts of the Em-2 obtained in Comparative Example 11 as the calcium silicate.

COMPARATIVE EXAMPLE 13

An adhesive composition was prepared as with Comparative Example 11 with the exception that 3 parts of Florite R used in Example 3 was dispersed into 100 parts of the Em-2 obtained in Comparative Example 11 as the calcium silicate.

There were determined the adhesive properties and the change in adhesive strength with time of the adhesive compositions shown in Examples and Comparative Examples described above.

The adhesive properties were determined by using test pieces prepared under the following adhesion conditions:

Adherend: 10 mm-thick Douglas fir
Spread:
 250 g/m² (single glue line)
 Spread on two faces to be bonded.
Pressing: 10 kg/cm²×2 hours (20° C.)
Conditioning: Allowed to stand at 20° C. for 10 day.

The test conditions were as follows:

(1) Compressive shearing strength

The test pieces were treated under the following conditions and the measurement was conducted in accordance with 4.11.1 "Compressive Shearing Strength" of JIS K6806 "Aqueous Polymer-Isocyanate Adhesive for Wood".

i) Ordinary state:
After the preparation of the test pieces, the test is carried out in an atmosphere of 20° C. and 65% RH.

ii) Hot water resistance
The test pieces are immersed in hot water of 60°±3° C. for 3 hours, and then immersed in water of room temperature until they are cooled. The test is carried out in a wet state.

iii) Heat resistance
The test pieces are allowed to stand in an atmosphere of 100°±1.5° C. for 16 hours, and thereafter immediately tested.

iv) Repeated boiling
After the immersion of the test pieces in boiling water for 4 hours, the test pieces are dried in the air of 60°±3° C. for 20 hours, and then further immersed in boiling water for 4 hours. Thereafter, the test pieces are immersed in water of room temperature until they are cooled, followed by subjecting them to the test in a wet state.

There is hereinafter shown a method for determining the change in adhesive strength with time.

Adhesive compositions were allowed to stand in an atmosphere of 20° C., and adhesion was conducted under the following conditions each day:
Adherend: 10 mm-thick Douglas fir
Spread:
  250 g/m² (single glue line)
  Spread on two faces to be bonded.
Pressing: 10 kg/cm²×2 hours (20° C.)
Conditioning: Allowed to stand at 20° C. for 10 day.

The repeated boiling treatments were conducted for the test pieces, and the compression shearing strength was determined.

The results are shown in Tables 1 and 2.

TABLE 1

| | Adhesive Composition | |
|---|---|---|
| No. | Vinyl Acetate Emulsion | Modifier |
| Example | | |
| 1 | Em-1 | Kemolit ABS-3 |
| 2 | Em-1 | Solex CM |
| 3 | Em-1 | Florite R |
| Comparative Example | | |
| 1 | Em-1 | Not added |
| 2 | Em-1 | Sumidur 44V-20 |
| 3 | Em-1 | Sumidur 44V-20 and Adeka Resin EP-4100 |
| 4 | Em-1 | Quick lime |
| 5 | Em-1 | Crystalite AI |
| 6 | Em-1 | Aerosil 200 |
| 7 | Em-1 | Whiton P-30 |
| 8 | Em-1 | Talc 3S |
| 9 | Em-1 | Burgess Kaolin Clay No. 10 |
| 10 | Em-1 | Micropax 20-A |
| 11 | Em-2 | Kemolit BS-3 |
| 12 | Em-2 | Solex CM |
| 13 | Em-2 | Florite R |

| | Compression Shearing Strength kg/cm² | | | |
|---|---|---|---|---|
| No. | Ordinary State | Hot Water Resistance | Heat Resistance | Repeated Boiling |
| Example | | | | |
| 1 | 142(100) | 48(0) | 46(0) | 28(0) |
| 2 | 154(95) | 48(0) | 47(0) | 37(0) |
| 3 | 154(90) | 54(0) | 36(0) | 41(0) |
| Comparative Example | | | | |
| 1 | 156(100) | 15(0) | 21(0) | 12(0) |
| 2 | 161(100) | 49(0) | 50(0) | 42(0) |
| 3 | 158(100) | 61(20) | 63(30) | 48(0) |
| 4 | 154(60) | 8(0) | 7(0) | 9(0) |
| 5 | 154(90) | 16(0) | 27(0) | 10(0) |
| 6 | 151(85) | 15(0) | 23(0) | 12(0) |
| 7 | 165(100) | 30(0) | 34(0) | 30(0) |
| 8 | 155(90) | 26(0) | 30(0) | 26(0) |
| 9 | 164(100) | 25(0) | 31(0) | 14(0) |
| 10 | 148(100) | 17(0) | 18(0) | 16(0) |
| 11 | 153(100) | 6(0) | 23(0) | 0 |
| 12 | 149(100) | 8(0) | 23(0) | 0 |
| 13 | 156(90) | 6(0) | 15(0) | 0 |

Unit: kg/cm²
(%) material breakage ratio

TABLE 2

| | Adhesive Composition | |
|---|---|---|
| No. | Vinyl Acetate Emulsion | Modifier |
| Example | | |
| 1 | Em-1 | Kemolit ABS-3 |
| 2 | Em-1 | Solex CM |
| 3 | Em-1 | Florite R |
| Comparative Example | | |
| 1 | Em-1 | Not added |
| 2 | Em-1 | Sumidur 44V-20 |
| 3 | Em-1 | Sumidur 44V-20 and Adeka Resin EP-4100 |
| 4 | Em-1 | Quick lime |
| 5 | Em-1 | Crystalite AI |
| 6 | Em-1 | Aerosil 200 |
| 7 | Em-1 | Whiton P-30 |
| 8 | Em-1 | Talc 3S |
| 9 | Em-1 | Burgess Kaolin Clay No. 10 |
| 10 | Em-1 | Micropax 20-A |
| 11 | Em-2 | Kemolit BS-3 |
| 12 | Em-2 | Solex CM |
| 13 | Em-2 | Florite R |

| | Compression Shearing Strength after Repeated Boiling | | | |
|---|---|---|---|---|
| No. | 0 day | 7 days | 15 days | 30 days |
| Example | | | | |
| 1 | 28(0) | 33(0) | 33(0) | 30(0) |
| 2 | 37(0) | 45(0) | 42(0) | 33(0) |
| 3 | 41(0) | 40(0) | 40(0) | 38(0) |
| Comparative Example | | | | |
| 1 | 12(0) | 11(0) | 12(0) | 10(0) |
| 2 | 44(0) | 12(0) | 14(0) | 11(0) |
| 3 | 50(10) | 14(0) | 11(0) | 12(0) |
| 4 | 9(0) | can not be adhered due to gelation | | |
| 5 | 10(0) | 15(0) | 11(0) | 12(0) |
| 6 | 12(0) | 10(0) | 13(0) | 11(0) |
| 7 | 30(0) | 14(0) | 15(0) | 19(0) |
| 8 | 26(0) | 18(0) | 14(0) | 12(0) |
| 9 | 14(0) | 13(0) | 13(0) | 11(0) |
| 10 | 16(0) | 15(0) | 15(0) | 14(0) |
| 11 | 0 | 0 | 0 | 0 |
| 12 | 0 | 0 | 0 | 0 |
| 13 | 0 | 0 | 0 | 0 |

Unit: kg/cm²
(%) material breakage ratio

The above results show that the present invention can provide the superior adhesive excellent in water-resistant adhesive property and in hot water-resistant adhesive property and having a slight change in adhesion with time.

EXAMPLE 4

Into 100 parts of the acetoacetylated vinyl acetate polymer emulsion (Em-1) was dispersed 20 parts of Kemolit ABS-3 (CaO: 48%, SiO₂: 49%, manufactured by Maruwa Biochemical Co., Ltd.) as the calcium silicate, and then 15 parts of Sumidur 44V-20 (MDI-series isocyanate, manufactured by Sumitomo Bayer Urethane Co., Ltd.) was mixed and dispersed therein as the isocyanate, thereby preparing an adhesive composition.

EXAMPLE 5

An adhesive composition was prepared as with Example 4 except that 5 parts of Solex CM (CaO: 21%, SiO₂: 57%, manufactured by Tokuyama Soda Co., Ltd.) was dispersed as the calcium silicate.

EXAMPLE 6

An adhesive composition was prepared as with Example 4 except that 3 parts of Florite R (CiO: 22%, SiO₂: 60%, manufactured by Tokuyama Soda Co., Ltd.) was dispersed as the calcium silicate.

COMPARATIVE EXAMPLE 14

Into 100 parts of the vinyl acetate emulsion (Em-1) used in Comparative Example 11 was dispersed 15 parts of Sumidur 44V-20 used in Example 4 was mixed and dispersed, thereby preparing an adhesive composition.

COMPARATIVE EXAMPLE 15

An adhesive composition was prepared as with Example 4 except that the calcium silicate was not used in Example 4.

COMPARATIVE EXAMPLE 16

An adhesive composition was prepared as with Example 4 except that the isocyanate compound was not used in Example 4.

COMPARATIVE EXAMPLE 17

An adhesive composition was prepared as with Example 5 except that the isocyanate compound was not used in Example 5.

COMPARATIVE EXAMPLE 18

An adhesive composition was prepared as with Example 6 except that the isocyanate compound was not used in Example 6.

COMPARATIVE EXAMPLE 19

An adhesive composition was prepared as with Example 4 with the exception that the calcium silicate was substituted for 5 parts of quick lime (CaO: at least 98%, extra pure reagent, manufactured by Junsei Kagaku Co.) in Example 4.

COMPARATIVE EXAMPLE 20

An adhesive composition was prepared as with Example 4 with the exception that the calcium silicate was substituted for 15 parts of silicic acid ($SiO_2$: at least 99%, Crystalite AI, manufactured by Takimori Ltd.) in Example 4.

COMPARATIVE EXAMPLE 21

An adhesive composition was prepared as with Comparative Example 20 except that 1 part of Aerosil 200 having a $SiO_2$ content of at least 99% (ultra fine-grained silicic acid anhydride, manufactured by Nippon Aerosil Co.) was used as silicic acid.

COMPARATIVE EXAMPLE 22

Into 100 parts of the Em-1 used in Example 4 was dispersed 15 parts of calcium carbonate (Whiton P-30, manufactured by Shiraishi Kogyo Kaisha, Ltd.), and then 15 parts of the isocyanate compound used in Example 4 was mixed and dispersed therein, thereby preparing an adhesive composition.

COMPARATIVE EXAMPLE 23

An adhesive composition was prepared as with Comparative Example 22 with the exception that calcium carbonate was substituted for 15 parts of talc (Talc 3S, manufactured by Nippon Talc Co.).

COMPARATIVE EXAMPLE 24

An adhesive composition was prepared as with Comparative Example 22 with the exception that calcium carbonate was substituted for 15 parts of kaolin clay (Burgess Kaolin Clay No.10, manufactured by Burgess Pigment Co.).

COMPARATIVE EXAMPLE 25

Into 100 parts of the Em-1 used in Example 4 was dispersed 35 parts of an epoxy resin emulsion (prepared by forcing to disperse 100 parts of a bisphenol A-type liquid epoxy resin into 100 parts of water with 4 parts of a nonionic emulsifier), and then 15 parts of the isocyanate compound used in Example 4 was mixed and dispersed therein, thereby preparing an adhesive composition (no calcium silicate was added thereto).

There were determined the adhesive properties, the change in adhesive strength with time and the change in viscosity with time of the adhesive compositions shown in Examples and Comparative Examples described above.

Tests for the adhesive properties were carried out similarly to those in Examples previously described.

However, 10 mm-thick birch was used as the adherend in the adhesion conditions.

Further, the following immersion separation test was added as a test condition.

IMMERSION SEPARATION TEST

Test pieces (each of which was prepared by bonding two plates having the same size, namely 75 mm in length $\times$ 75 mm in width $\times$ 20 mm in thickness, to each other) were evaluated based on the immersion separation test of a laminated lumber specified by Japanese Agricultural Standard.

There is hereinafter shown a method for determining the change in adhesive strength with time of an adhesive after the repeated boiling at 30° C.

An adhesive paste was prepared at 30° C. and allowed to stand in a constant temperature water bath of 30° C. Test pieces were prepared under the following adhesion conditions:

Adherend: 10 mm-thick birch
Spread:
  250 g/m² (single glue line)
  Spread on two faces to be bonded.
Pressing: 10 kg/cm² $\times$ 2 hours (20° C.)
Conditioning: Allowed to stand at 20° C. for 10 day.

The repeated boiling treatments were conducted for the test pieces, and the compression shearing strength was determined.

Further, there is hereinafter shown a method for determining the change in viscosity with time of an adhesive.

An adhesive paste was prepared at 30° C. and allowed to stand in a constant temperature water bath of 30° C. The viscosity of the adhesive was determined by using a BH-type viscometer manufactured by Tokyo Keiki Co., Ltd. each time.

The results are shown in Tables 3 to 5.

TABLE 3

| | Adhesive Properties | | | |
|---|---|---|---|---|
| | Adhesive Composition | | | |
| No. | Vinyl Acetate Emulsion | Modifier | Isocyanate Compound | Epoxy Resin |
| Example | | | | |
| 4 | Em-1 | Kemolit ABS-3 | Sumidur 44V-20 | Not added |
| 5 | Em-1 | Solex CM | Sumidur 44V-20 | Not added |
| 6 | Em-1 | Florite R | Sumidur 44V-20 | Not added |
| Comparative Example | | | | |
| 14 | Em-2 | Not added | Sumidur 44V-20 | Not added |
| 15 | Em-1 | Not added | Sumidur 44V-20 | Not added |
| 16 | Em-1 | Kemolit | Not added | Not added |

TABLE 3-continued

Adhesive Properties

| No. | | | | |
|---|---|---|---|---|
| 17 | Em-1 | Solex CM ABS-3 | Not added | Not added |
| 18 | Em-1 | Florite R | Not added | Not added |
| 19 | Em-1 | Quick lime | Not added | Not added |
| 20 | Em-1 | Crystalite AI | Not added | Not added |
| 21 | Em-1 | Aerosil 200 | Not added | Not added |
| 22 | Em-1 | Whiton P-30 | Not added | Not added |
| 23 | Em-1 | Talc 3S | Not added | Not added |
| 24 | Em-1 | Burgess Kaolin Clay No. 10 | Not added | Not added |
| 25 | Em-1 | Not added | Not added | Adeka Resin EP-4100 |

Compression Shearing Strength kg/cm²

| No. | Ordinary State | Hot Water Resistance | Heat Resistance | Repeated Boiling |
|---|---|---|---|---|
| Example | | | | |
| 4 | 187(90) | 97(20) | 113(30) | 86(40) |
| 5 | 186(90) | 88(20) | 94(20) | 74(60) |
| 6 | 189(90) | 91(30) | 105(30) | 89(30) |
| Comparative Example | | | | |
| 14 | 178(90) | 41(0) | 68(0) | 40(0) |
| 15 | 183(90) | 38(0) | 58(0) | 31(0) |
| 16 | 186(80) | 23(0) | 46(0) | 18(0) |
| 17 | 187(90) | 24(0) | 41(0) | 15(0) |
| 18 | 177(90) | 21(0) | 43(0) | 16(0) |
| 19 | 158(0) | 30(0) | 25(0) | 25(0) |
| 20 | 188(90) | 42(0) | 71(0) | 31(0) |
| 21 | 181(90) | 36(0) | 65(0) | 41(0) |
| 22 | 171(90) | 61(0) | 56(0) | 50(0) |
| 23 | 183(90) | 58(0) | 75(0) | 57(0) |
| 24 | 190(90) | 46(0) | 71(0) | 47(0) |
| 25 | 186(90) | 63(0) | 68(0) | 58(0) |

Immersion Separation

| No. | Separation (%) | Judgment |
|---|---|---|
| Example | | |
| 4 | 0 | Accepted |
| 5 | 0 | Accepted |
| 6 | 0 | Accepted |
| Comparative Example | | |
| 14 | 43 | Rejected |
| 15 | 48 | Rejected |
| 16 | 100 | Rejected |
| 17 | 100 | Rejected |
| 18 | 100 | Rejected |
| 19 | 98 | Rejected |
| 20 | 41 | Rejected |
| 21 | 23 | Rejected |
| 22 | 38 | Rejected |
| 23 | 21 | Rejected |
| 24 | 50 | Rejected |
| 25 | 20 | Rejected |

Numerical values in parentheses indicate the wood breakage ratio.

TABLE 4

Change in Adhesive Strength with Time after Repeated Boiling at 30° C.

Adhesive Composition

| No. | Vinyl Acetate Emulsion | Modifier | Isocyanate Compound | Epoxy Resin |
|---|---|---|---|---|
| Example | | | | |
| 4 | Em-1 | Kemolit ABS-3 | Sumidur 44V-20 | Not added |
| 5 | Em-1 | Solex CM | Sumidur 44V-20 | Not added |
| 6 | Em-1 | Florite R | Sumidur 44V-20 | Not added |
| Comparative Example | | | | |
| 14 | Em-2 | Not added | Sumidur 44V-20 | Not added |
| 15 | Em-1 | Not added | Sumidur 44V-20 | Not added |
| 16 | Em-1 | Kemolit ABS-3 | Not added | Not added |
| 17 | Em-1 | Solex CM | Not added | Not added |
| 18 | Em-1 | Florite R | Not added | Not added |
| 19 | Em-1 | Quick lime | Sumidur 44V-20 | Not added |
| 20 | Em-1 | Crystalite AI | Sumidur 44V-20 | Not added |
| 21 | Em-1 | Aerosil 200 | Sumidur 44V-20 | Not added |
| 22 | Em-1 | Whiton P-30 | Sumidur 44V-20 | Not added |
| 23 | Em-1 | Talc 3S | Sumidur 44V-20 | Not added |
| 24 | Em-1 | Burgess Kaolin Clay No. 10 | Sumidur 44V-20 | Not added |
| 25 | Em-1 | Not added | Sumidur 44V-20 | Adeka Resin EP-4100 |

Change in Adhesive Strength with Time after Repeated Boiling

| No. | 0 hour | 2 hours | 8 hours | 16 hours | 24 hours |
|---|---|---|---|---|---|
| Example | | | | | |
| 4 | 86(40) | 85(10) | 76(0) | 68(0) | 58(0) |
| 5 | 74(60) | 80(20) | 74(0) | 70(0) | 61(0) |
| 6 | 89(30) | 86(10) | 73(0) | 69(0) | 62(0) |
| Comparative Example | | | | | |
| 14 | 31(0) | 21(0) | 11(0) | 5(0) | 5(0) |
| 15 | 38(0) | 36(0) | 26(0) | 23(0) | 16(0) |
| 16 | 35(0) | 33(0) | 31(0) | 32(0) | 33(0) |
| 17 | 33(0) | 31(0) | 34(0) | 33(0) | 32(0) |
| 18 | 28(0) | 30(0) | 28(0) | 31(0) | 31(0) |
| 19 | 25(0) | 0 | 0 | 0 | 0 |
| 20 | 31(0) | 29(0) | 20(0) | 19(0) | 14(0) |
| 21 | 41(0) | 40(0) | 33(0) | 22(0) | 13(0) |
| 22 | 50(0) | 48(0) | 40(0) | 26(0) | 18(0) |
| 23 | 47(0) | 43(0) | 44(0) | 39(0) | 31(0) |
| 24 | 45(0) | 45(0) | 38(0) | 28(0) | 21(0) |
| 25 | 58(0) | 42(0) | 33(0) | 22(0) | 18(0) |

Numerical values in parentheses indicate the wood breakage ratio.

TABLE 5

Change in Viscosity with Time

Adhesive Composition

| No. | Vinyl Acetate Emulsion | Modifier | Isocyanate Compound | Epoxy Resin |
|---|---|---|---|---|
| Example | | | | |
| 4 | Em-1 | Kemolit ABS-3 | Sumidur 44V-20 | Not added |
| 5 | Em-1 | Solex CM | Sumidur 44V-20 | Not added |
| 6 | Em-1 | Florite R | Sumidur 44V-20 | Not added |
| Comparative Example | | | | |
| 14 | Em-2 | Not added | Sumidur 44V-20 | Not added |
| 15 | Em-1 | Not added | Sumidur 44V-20 | Not added |
| 16 | Em-1 | Kemolit ABS-3 | Not added | Not added |
| 19 | Em-1 | Quick lime | Sumidur 44V-20 | Not added |
| 20 | Em-1 | Crystalite AI | Sumidur 44V-20 | Not added |

TABLE 5-continued

| | | Change in Viscosity with Time | | |
|---|---|---|---|---|
| 22 | Em-1 | Whiton P-30 | Sumidur 44V-20 | Not added |
| 25 | Em-1 | Not added | Sumidur 44V-20 | Adeka Resin EP-4100 |

| | Elapsed Time and Viscosity P/30° C. | | | | |
|---|---|---|---|---|---|
| No. | 0 hour | 2 hours | 8 hours | 16 hours | 24 hours |
| Example | | | | | |
| 4 | 470 | 540 | 850 | 900 | 980 |
| 5 | 520 | 860 | 880 | 980 | 1000 |
| 6 | 1400 | 1100 | 1100 | 1100 | 1100 |
| Comparative Example | | | | | |
| 14 | 280 | 380 | 470 | 500 | 480 |
| 15 | 62 | 65 | 69 | 75 | 85 |
| 16 | 430 | 430 | 530 | 430 | 430 |
| 19 | 250 | Gel | Gel | Gel | Gel |
| 20 | 75 | 110 | 120 | 130 | 132 |
| 22 | 110 | 145 | 230 | 520 | 520 |
| 25 | 34 | 52 | 62 | 78 | 85 |

Unit: poise

The results shown in Tables 3 to 5 indicate that the present invention can provide the adhesive retaining the adhesive strength for a long period of time, particularly having a little reduction in initial adhesive strength, and excellent in water resistance (water-resistant adhesion) and also in heat resistance (heat-resistant adhesion) compared to those of the prior-art adhesives.

INDUSTRIAL APPLICABILITY

The adhesive composition of the present invention is compatible for use in adhering various materials as an adhesive, and particularly it can be suitably used as an adhesive composition for wood.

For example, it is useful as an adhesive used in the field of wood such as laminated lumber, high-grade furniture, thick veneer and flash boards, in which the high water resistance is required.

It is also usable for adhesion between wood and paper, textile products, inorganic boards or films, in addition to adhesion between wood and wood.

We claim:

1. An adhesive composition comprising a vinyl acetate polymer emulsion which contains acetoacetylated polyvinyl alcohol as a protective colloid and which further contains a calcium silicate.

2. An adhesive composition comprising a vinyl acetate polymer emulsion which contains acetoacetylated polyvinyl alcohol as a protective colloid and which further contains a calcium silicate and an isocyanate compound or an isocyanate polymer.

3. An adhesive composition according to claim 1 or 2, in which said calcium silicate is a compound consisting of calcium oxide and silicon dioxide which are combined with each other.

4. An adhesive composition according to claim 3, in which said calcium silicate compound has a calcium-silicon oxide composition ratio ($CaO/SiO_2$) of 5/95 to 60/40.

5. An adhesive composition according to claim 1 or 2, in which the calcium silicate is present in an amount of 0.5 to 100 parts by weight to 100 parts by weight of the vinyl acetate polymer emulsion containing the acetoacetylated polyvinyl alcohol as the protective colloid.

6. An adhesive composition according to claim 2, in which the vinyl acetate polymer emulsion containing the acetoacetylated polyvinyl alcohol as the protective colloid contains the acetoacetylated polyvinyl alcohol in an amount of 6 to 20% by weight to a solid content in said vinyl acetate polymer emulsion.

7. An adhesive composition according to claim 2, in which the isocyanate compound or the isocyanate polymer is present in an amount of 40 to 800 parts by weight to a solid content of the acetoacetylated polyvinyl alcohol contained in the vinyl acetate polymer emulsion.

* * * * *